United States Patent
Blumenthal et al.

(10) Patent No.: US 7,203,482 B2
(45) Date of Patent: Apr. 10, 2007

(54) AUTHENTICATION OF MOBILE DEVICES VIA PROXY DEVICE

(75) Inventors: Steven Blumenthal, 17 Moon Hill Rd., Lexington, MA (US) 02421-6112; Oliver C. Ibe, Andover, MA (US)

(73) Assignee: Steven Blumenthal, Lexington, MA (US)

( * ) Notice: Subject to any disclaimer, the term of this patent is extended or adjusted under 35 U.S.C. 154(b) by 0 days.

(21) Appl. No.: 10/836,056

(22) Filed: Apr. 30, 2004

(65) Prior Publication Data

US 2004/0219905 A1 Nov. 4, 2004

Related U.S. Application Data

(60) Provisional application No. 60/467,822, filed on May 2, 2003, provisional application No. 60/467,430, filed on May 2, 2003.

(51) Int. Cl.
*H04M 1/66* (2006.01)
(52) U.S. Cl. .................. 455/411; 455/435.1; 455/455; 455/426.1; 370/338; 370/328; 370/352
(58) Field of Classification Search ................ 455/411, 455/435.1, 445, 426.1, 433; 370/463, 386, 370/329, 389; 380/270
See application file for complete search history.

(56) References Cited

U.S. PATENT DOCUMENTS

| | | | | |
|---|---|---|---|---|
| 2002/0191635 A1* | 12/2002 | Chow et al. | ................ | 370/463 |
| 2003/0134638 A1* | 7/2003 | Sundar et al. | ............. | 455/435 |
| 2003/0202486 A1* | 10/2003 | Anton et al. | ................ | 370/329 |
| 2004/0072593 A1* | 4/2004 | Robbins et al. | ............. | 455/560 |
| 2004/0105434 A1* | 6/2004 | Baw | ........................... | 370/355 |
| 2004/0203800 A1* | 10/2004 | Myhre et al. | ............... | 455/445 |
| 2005/0031124 A1* | 2/2005 | Jain et al. | .................... | 380/270 |

* cited by examiner

*Primary Examiner*—Joseph Feild
*Assistant Examiner*—David Q. Nguyen
(74) *Attorney, Agent, or Firm*—Houston Eliseeva LLP

(57) ABSTRACT

A mechanism to permit the cryptographic authentication of a mobile device in the cellular carrier's network when the device is present in the 802.11 network, wireless LAN, served by a Cellular Controller and not connected directly to the cellular carrier's network via a radio link is disclosed. The Cellular Controller acts as a proxy for the mobile device when the device is in a building served by an 802.11 wireless LAN. The solutions features the separation of a mobile device's radio function from its ANSI-41 authentication mechanism to permit the proxy function to work and to not have to duplicate the ANSI-41 authentication data and CAVE algorithm.

10 Claims, 3 Drawing Sheets

Architecture of the Baseline Network

Figure 1. Architecture of the Baseline Network under the heading "AUTHENTICATION OF MOBILE DEVICES VIA PROXY DEVICE".

AUTHENTICATION OF MOBILE DEVICES VIA PROXY DEVICE

RELATED APPLICATIONS

This application is claims the benefit of the filing date of Provisional Appl. Nos. 60/467,822 and 60/467,430, filed on May 5, 2003, under 35 U.S.C. 119(e), both of which applications are incorporated herein by this reference in their entirety.

This application relates to U.S. Pat. Appl. No. 10/836,057 filed Apr. 30, 2004, by the same inventors, entitled Data Handoff Method Between Wireless Local Area Network and Wireless Wide Area Network, which is incorporated herein in its entirety by this reference.

BACKGROUND OF THE INVENTION

A mobile communication network generally uses strong digital cryptographic mechanisms to authenticate a mobile station (MS) (handset device, laptop computer, or personal digital assistant (PDA)) before it can be permitted to operate in the network. It may also require the MS to encrypt voice and data traffic sent over the radio interface. Mechanisms such as Subscriber Identity Modules (SIM) cards and cellular authentication and voice encryption (CAVE) algorithm are used for GSM, CDMA or IDEN cell phones and other devices that operate in these networks. These mechanisms can also be used to authenticate these devices on private networks.

Cryptographic methods are used to authenticate a MS to the service provider's network and to encrypt voice and data traffic. ANSI-41 standards, which are used in IS-136 and IS-95 networks, use shared secret keys where the key is loaded into the mobile station and also kept at the authentication center associated with the home location register (HLR) of the mobile user's billing service provider. There are also mechanisms that allow these secret keys to be shared with the visitor location register (VLR) of a visited network. The VLR can be associated with the user's service provider or it can be owned by another service provider. Communication between the HLR and VLR usually occurs over packet switched Signaling System 7 (SS7) networks via the roaming arrangements between the carriers, if the home network and the visited network belong to different carriers. Otherwise, it occurs over the carrier's private internal data network.

The ANSI-41 mechanism to register a MS with a service provider uses the cellular authentication and voice encryption (CAVE) algorithm to produce an authentication result (AUTHR) to be sent to the authentication system of its HLR. The CAVE algorithm uses as inputs the equipment serial number (ESN) installed in the phone by the manufacturer, the mobile identification number (MIN) (in North America MIN is usually the phone number) installed at the time the device is sold and first brought into service on the service provider's network, the shared secret data (SSD) that are installed in the MS and also kept at the service provider's authentication center (AC) associated with the HLR, and a random number provided to the MS by the service provider. The AUTHR is received by the authentication center and if it matches the AUTHR that it computed using the CAVE algorithm with the same set of input parameters, the user is allowed to register with the service provider's network and use their mobile device.

There is also a mechanism to encrypt voice and data transmissions over the wireless channel. In this case in addition to using the CAVE algorithm to produce the AUTHR, the MS also uses the MIN, ESN, SSD and a random number from the carrier network to produce a voice privacy mask (VPMASK) and a signaling message encryption key (SMEKEY). The VPMASK and SMEKEY are also computed by the authentication center associated with the HLR and the results are compared with those of the MS. The VPMASK is used to encrypt voice over the radio channel between the MS and the nearest service provider system. The SMEKEY is used to encrypt certain fields of signaling messages between the MS and the nearest service provider system.

The authentication mechanism for GSM systems is similar to that of ANSI-41 systems except that GSM stores the secret key and the authentication algorithm in a subscriber identity module (SIM) smart card. The SIM is designed to be tamper-proof and contains data and algorithms that cannot be easily read out by a user.

To authenticate a user, the MS and HLR perform similar calculations using the same algorithm $A_3$ and encryption variables $K_i$ and a random number from the service provider's network to produce a signed result (SRES). The SRESs are compared and if they match, the MS is authenticated and admitted into the network. This comparison is typically performed by the serving Mobile Switching Center (MSC), though other devices along the path can also do this comparison. One of the outputs of another authentication algorithm $A_8$ is an encryption key $K_c$ that is fed into an encrypter and decrypter using algorithm $A_5$ to encode the voice or data stream. $K_i$, $A_3$, $A_5$, and $A_8$ are variables that are all contained in the SIM smart card.

A new class of devices that operate on public or private cellular networks using GSM, CDMA, or IDEN in one mode of operation and on public or private IEEE 802.11 wireless local area networks (LANs) in another mode of operation is being introduced.

SUMMARY OF THE INVENTION

In a general aspect, the invention features a mechanism to permit the cryptographic authentication of the mobile device in the cellular carrier's network when the device is present in the 802.11 network, wireless LAN, served by a Cellular Controller and not connected directly to the cellular carrier's network via a radio link. The Cellular Controller acts as a proxy for the mobile device when the device is in a building served by an 802.11 wireless LAN In another aspect, the invention features separation of a mobile device's radio function from its ANSI-41 authentication mechanism to permit the proxy function to work and to not have to duplicate the ANSI-41 authentication data and CAVE algorithm.

In another aspect, the invention features separation of a mobile device's radio function from its GSM SIM module to permit the proxy function to work and to not have to duplicate the SIM module.

Communication between the Cellular Controller, which contains the radio function and acts as a proxy for the mobile device on the cellular carriers while the device is operating on the 802.11 wireless LAN, and the mobile device in the wireless LAN can use user datagram protocol (UDP) to carry encrypted voice and data messages and transmission control protocol (TCP) to carry authentication messages.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Provisional patent application Ser. No. 60/419,674 titled "Method of Seamless Roaming Between Wi-Fi Network and Cellular Network" and U.S. patent application Ser. No. 10/668,608, filed Oct. 17, 2003, entitled "Method of Seamless Roaming Between Wireless Local Area Networks and Cellular Carrier Networks", which are incorporated herein in their entirely by this reference, describe a Cellular Controller device that connects the 802.11 wireless local area network to the cellular carrier's network.

Figure 1:
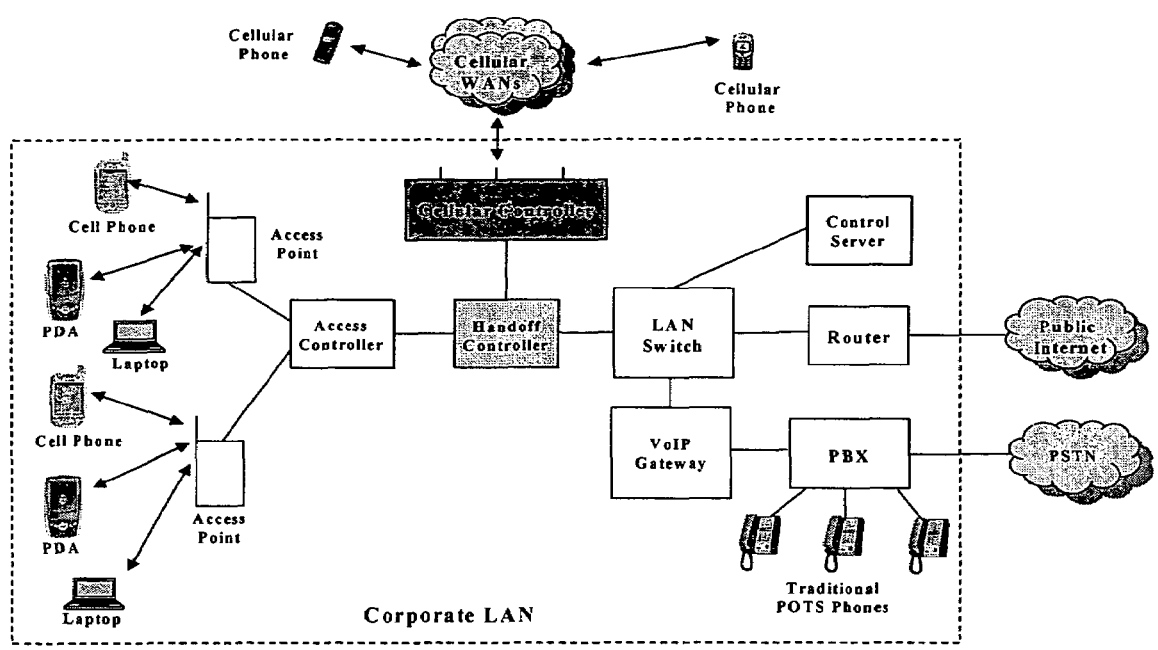
FIG. 1 is a block diagram showing of an architecture of an exemplary network, according to the present invention.

The Cellular Controller permits mobile devices (also known as mobile terminals, mobile stations) to operate inside a building or some other defined area that has 802.11 wireless local area network coverage in the 802.11 wireless mode and to be present on the cellular carrier's network via a radio proxy for the that mobile device. The radio proxy of the device that exists in the Cellular Controller behaves to the cellular carrier's network exactly as the device would behave if the real one was connected to the carrier's network. That is, the Cellular Controller emulates the mobile device An architecture of an exemplary network is shown in FIG. 1. When a subscriber (cell phone, PDA, laptop) with a dual mode mobile device is in the building (corporate LAN) controlled by the Cellular Controller, the device's default operation is the 802.11 mode and therefore the cellular radio of the mobile device is turned off. The Cellular Controller creates a proxy for the user's mobile device in the cellular carrier's network (cellular WANs). This proxy authenticates the user on the cellular carrier's network and then sends and receives calls and data messages to and from the cellular carrier's network on behalf of the user. The Cellular Controller works with the Control Server in the enterprise's LAN to locate the user in the building and to determine which 802.11 Access Point is serving the user.

When the Cellular Controller receives a call from the cellular carrier network that is destined for a mobile device it is proxying for, it uses the Session Initiation Protocol (SIP)-based voice over IP (VoIP) to forward the call via the corporate LAN to the mobile device. Similarly, voice and data messages that originate at the mobile device operating in 802.11 WLAN mode use SIP to set up a call to the Cellular Controller, if it is intended to be transmitted out of the building over the cellular carrier's network. The device then uses VoIP over WLAN to transmit the voice packets over the wireless LAN infrastructure where it is received by the Access Point and forwarded to the Cellular Controller over the wired LAN infrastructure. The Cellular Controller converts the packet into the appropriate format for transmission over the cellular network.

When a dual-mode mobile device is turned on in the 802.11 mode inside the building served by the Cellular Controller, it goes through an enterprise registration process with the Control Server to determine if it is allowed to use the 802.11 wireless LAN. If it is an allowed device then the Control Server instructs the Cellular Controller to set up a cell phone proxy for this dual-mode mobile device in the CDMA network for which the user is a subscriber. The Cellular Controller requests that the cellular carrier network send it a Random (RAND) number to initiate the authentication process. The Cellular Controller opens a TCP connection to the mobile device over the enterprise's wired and wireless LAN and transmits RAND to the mobile using TCP/IP. The mobile device receives the RAND and uses it along with its SSD, MIN and ESN to run the CAVE algorithm. It then sends the authentication result (AUTHR) back to the Cellular Controller over the wired and wireless LAN using TCP/IP. The Cellular Controller strips off the TCP/IP headers and transmits the AUTHR back to the cellular carrier network on behalf of the mobile device for which it is proxying. If the AUTHR matches the calculation made by the authentication center inside the cellular carrier's network, the user is authenticated and the proxy is allowed to send and receive calls on the cellular carrier network on behalf of the mobile device that is operating in the 802.11 network.

Figure 2:
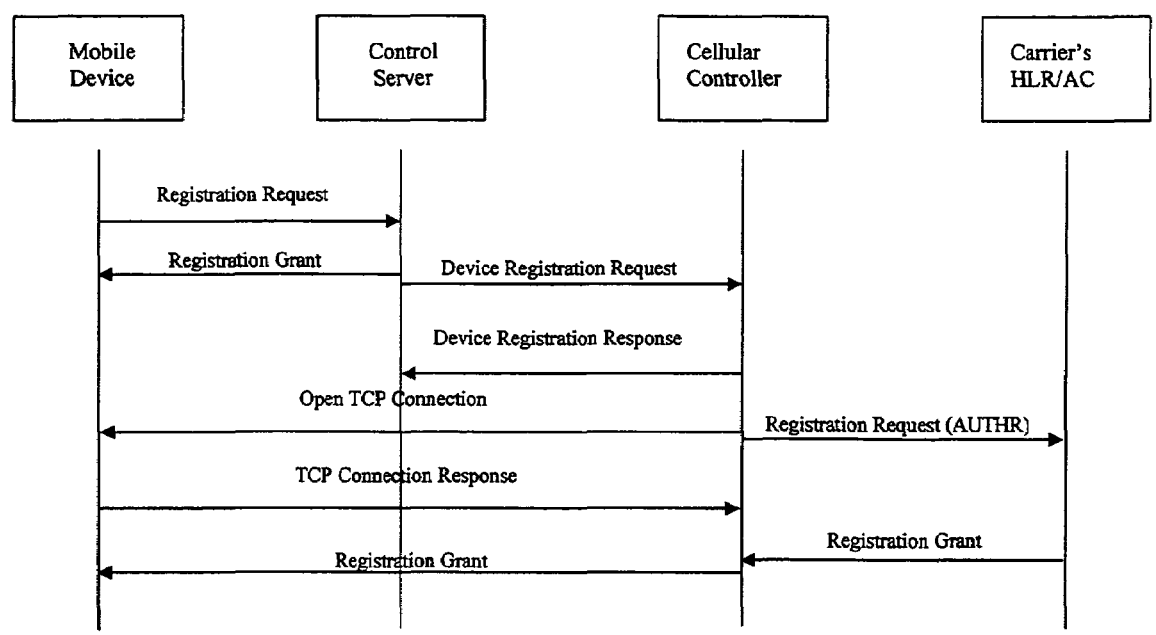
FIG. 2 is a message flow diagram illustrating authentication of a mobile station (MS) on a cellular according to the present invention.

Authentication of a mobile station (MS) with an ANSI-41 (CDMA or IDEN) cellular network involves additional steps. To authenticate a mobile station operating on an 802.11 wireless local area network on an ANSI-41 wide area cellular network using a cellular proxy server such as the Cellular Controller, there is a separation of the over-the-air radio portion of the mobile station from its authentication mechanism. The Cellular Controller sends and receives authentication messages on behalf of the mobile station and then passes them onto to the mobile station using TCP/IP protocols over the internal wired and wireless local area networks. The mobile station receives these TCP/IP encapsulated messages, strips off the TCP/IP headers and then passes the message content to the CAVE authentication mechanism in the mobile station. The results are sent back to the Cellular Controller over the internal wireless and wired local area networks using TCP/IP protocols. The Cellular Controller strips off the TCP/IP headers and, using its radio, passes the messages back over-the-air to the ANSI-41 cellular network. To the ANSI-41 cellular network, this exchange looks like its normal authentication exchange with a mobile station. FIG. 2 is a message flow diagram that summarizes the above procedure. The messages in the figure represent actions taken rather than the exact messages exchanged.

Authentication on a GSM network involves additional steps.

When a dual-mode mobile device is turned on in the 802.11 mode inside the building served by the Cellular Controller, it goes through an enterprise registration process with the Cellular Controller to determine if it is allowed to use the 802.11 wireless LAN. If it is an allowed device then the Cellular Controller sets up a cell phone proxy for this dual mode mobile device on the GSM network in which the user is a subscriber using the user's personal identification number (PIN) that is registered with the Cellular Controller during the mobile device's registration in the WLAN. The Cellular Controller requests that the cellular carrier network initiate the authentication process. The Cellular Controller opens a TCP connection to the mobile device over the enterprise's wired and wireless LAN and transmits the RAND to the mobile device using TCP/IP. The mobile device receives the RAND and uses it along with its secret key $K_i$ to run the $A_3$ algorithm through its SIM module. It then sends the signed result (SRES) back to the Cellular Controller over the wired and wireless LAN via a TCP connection. The Cellular Controller strips off the TCP/IP headers and transmits the SRES back to the cellular carrier network on behalf of the mobile device for which it is proxying. If the SRES matches the calculation made by the authentication center inside the cellular carrier's network, the user is authenticated and the proxy is allowed to send and receive calls on the cellular carrier network on behalf mobile device that is operating in the 802.11 network.

If voice and signaling encryption is used in the cellular carrier's network, then the RAND received by the mobile device over the 802.11 wireless LAN is passed to the $A_8$ algorithm associated with the SIM module and used to compute $K_c$, an encryption key used to encrypt voice and data messages sent over the cellular carrier's network. In this case, the mobile device generates encrypted data, which is then packetized and transmitted over the wireless and wired LAN using UDP/IP for the voice traffic and TCP/IP for the data messages to the Cellular Controller. The Cellular Controller strips off the UDP/IP and TCP/IP headers and sends the encrypted bits over the GSM channel to the cellular carrier's network. A similar reverse process receives encrypted voice and data from the cellular carrier network at the Cellular Controller, packetize the data, and then encapsulates it in either UDP/IP or TCP/IP for transmission to the mobile device over the enterprise's wired and wireless LAN infrastructure.

To authenticate a mobile station operating on an 802.11 wireless local area network on an GSM wide area cellular network using a cellular proxy server such as the Cellular Controller, the over-the-air radio portion of the mobile station is separately handled from its authentication mechanism. The Cellular Controller sends and receives authentication messages on behalf of the mobile station and then passes them onto to the mobile station using TCP/IP protocols over the internal wired and wireless local area networks. The mobile station receives these TCP/IP encapsulated messages, strips off the TCP/IP headers and then passes the message content to the SIM module authentication mechanism in the mobile station. The results are sent back to the Cellular Controller over the internal wireless and wired local area networks using TCP/IP protocols. The Cellular Controller strips off the TCP/IP headers and using its radio passes the messages back over-the-air to the GSM cellular network. To the GSM cellular network, this exchange looks like its normal authentication exchange with a mobile station.

Figure 3:
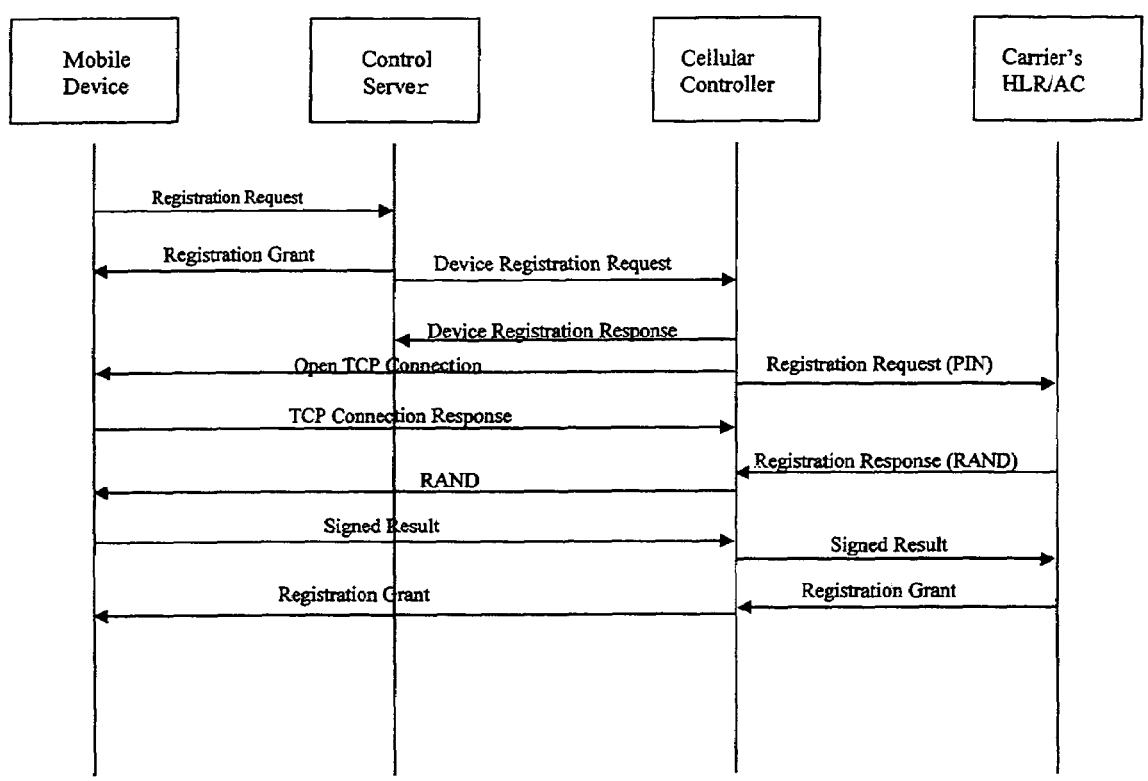
FIG. 3 is a message flow diagram illustrating authentication of a mobile station (MS) on a cellular according to another embodiment of the present invention.

FIG. 3 is a message flow diagram that summarizes the above procedure. The messages in the figure represent actions taken rather than the exact messages exchanged.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method comprising:
    emulating a mobile terminal, or a group of mobile terminals on a wide area wireless network using a fixed radio terminal;
    establishing a communication path passing from the wide area wireless network through the fixed radio terminal over a local network to the mobile terminal or group of mobile terminals, wherein the communications path uses protocols for the wide area wireless network between the fixed radio terminal and the wide area wireless network and local network protocols between the fixed radio terminal and the mobile terminal or terminals that are connected to the local network;
    a controller of the fixed radio terminal receiving authentication information from the wide area wireless network;
    the controller encapsulating the authentication information in the protocol of the local network and passing the authentication information to the mobile terminal;
    the mobile terminal generating an authentication result from the authentication information that is transmitted to the controller using the local network protocol; and
    the controller transmitting the authentication result to the wide area wireless network using the wide area network protocol.

2. The method of claim 1 further comprising hosting functions of an ANSI-41 authentication mechanism at the mobile terminal.

3. The method of claim 1 further comprising hosting functions of a GSM authentication mechanism at the mobile terminal.

4. The method of claim 1 further comprising passing voice or data communication between the mobile terminal and the wide area wireless network over the established communication path.

5. The method of claim 1 further comprising hosting voice or data encryption functions at the mobile terminal for processing voice communication.

6. The method of claim 5 wherein the step of hosting the voice or data encryption functions at the mobile terminal includes hosting a CAVE algorithm.

7. The method of claim 5 wherein step of hosting the voice or data encryption functions at the mobile terminal includes hosting a GSM algorithm.

8. The method of claim 1 wherein the local network protocols include Session Initiation Protocol.

9. A system comprising:
    a cellular wireless network;
    a local area network;
    mobile cellular terminals capable of communicating over the cellular wireless network and the local area network; and
    a controller that emulates the mobile terminals on the cellular wireless network using a fixed radio terminal when the mobile terminals are connected to the local area network, the controller establishing a communication path passing from the cellular wireless network through the fixed radio terminal over a local area network to the mobile terminals, wherein the controller uses protocols for the cellular wireless network between the fixed radio terminal and the cellular wireless network and local network protocols to the mobile terminals, wherein the controller receives authentication information from the cellular wireless network and encapsulates the authentication information in the protocol of the local area network, passes the authentication information to the mobile terminals, the mobile terminals generating an authentication result from the authentication information that is transmitted to the controller using the local area network protocol, and the controller transmits the authentication result to the cellular wireless network using the cellular wireless network protocol.

10. The system of claim 9 wherein the local area network protocols include Session Initiation Protocol.

* * * * *